(No Model.)

F. M. CARTER.
MACHINE FOR DRIVING HEADLESS NAILS.

No. 270,280. Patented Jan. 9, 1883.

Witnesses:
Thomas Hibbard.
Walter E. Lombard.

Inventor:
Francis M. Carter
by N. C. Lombard
Attorney.

(No Model.)  
5 Sheets—Sheet 2.

F. M. CARTER.
MACHINE FOR DRIVING HEADLESS NAILS.

No. 270,280. Patented Jan. 9, 1883.

Witnesses:  
Thomas Hibbard  
Walter E. Lombard

Inventor:  
Francis M. Carter  
by N. C. Lombard  
Attorney.

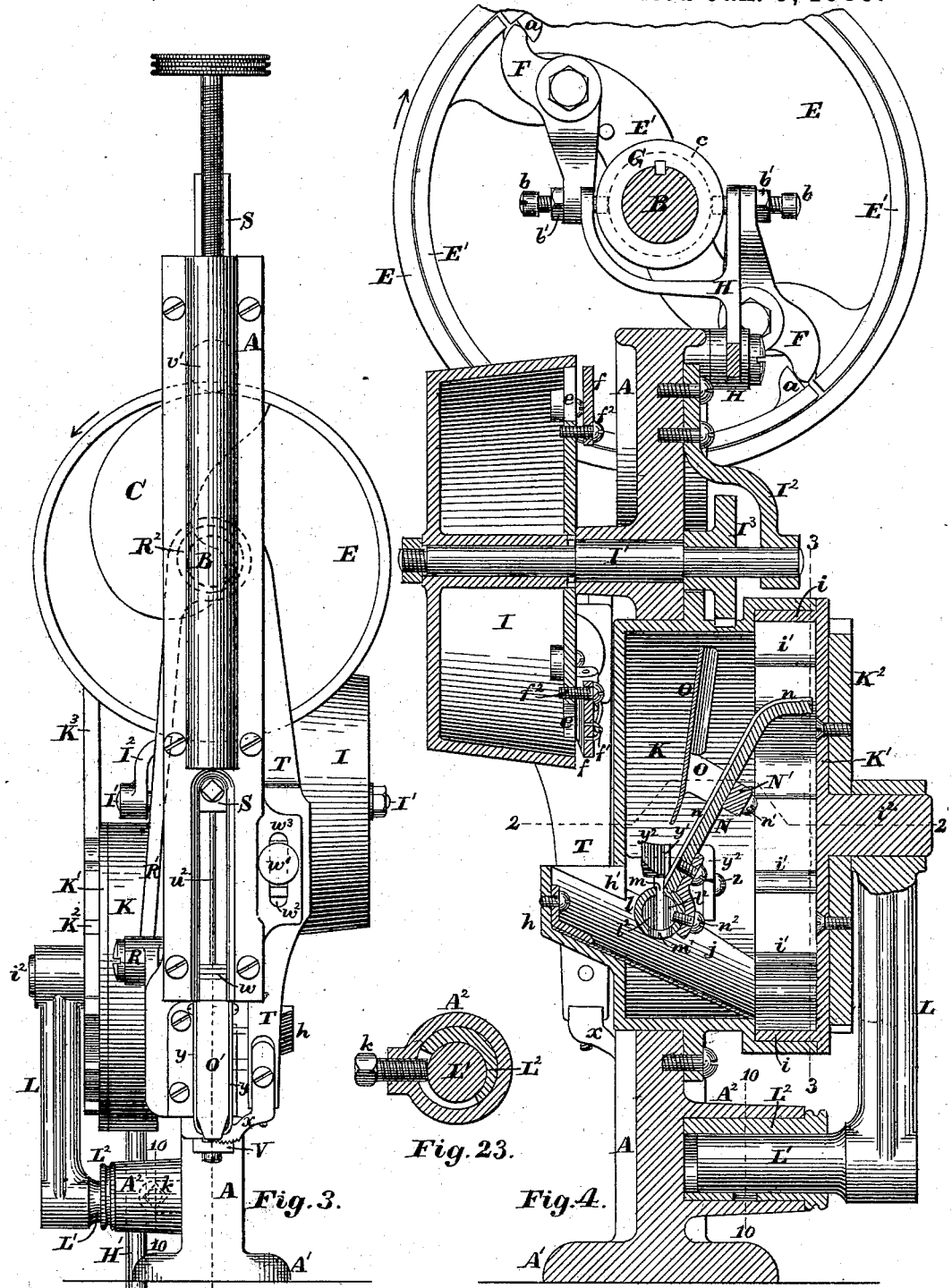

(No Model.) 5 Sheets—Sheet 4.
F. M. CARTER.
MACHINE FOR DRIVING HEADLESS NAILS.
No. 270,280. Patented Jan. 9, 1883.
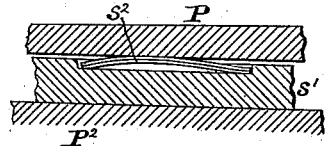
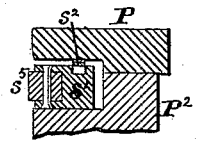
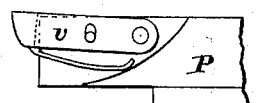
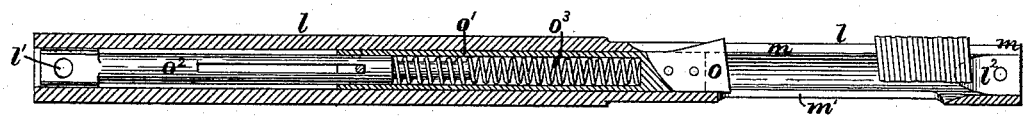
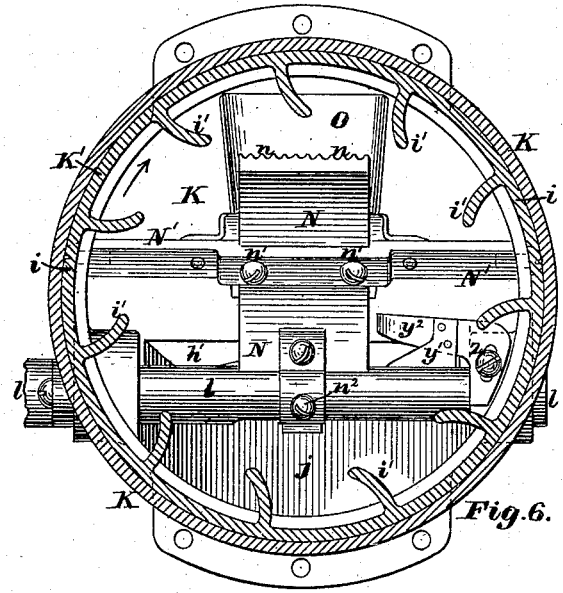
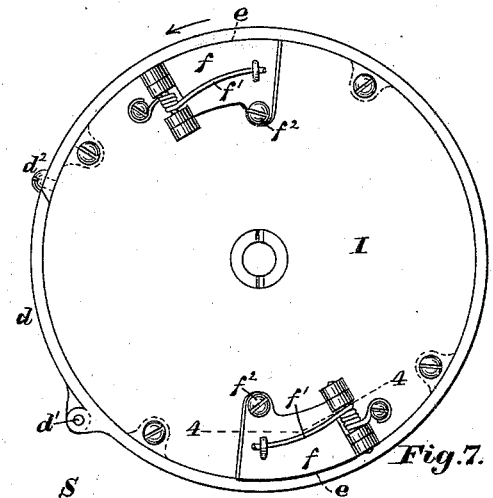
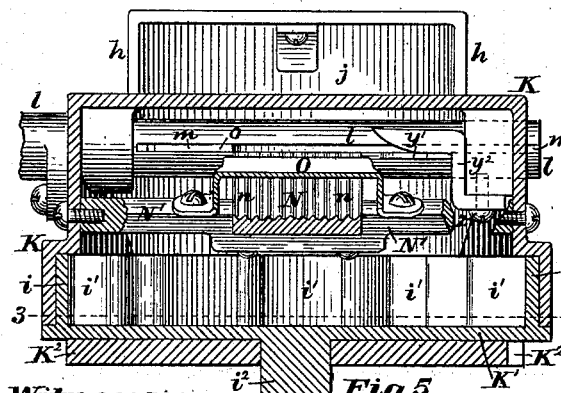
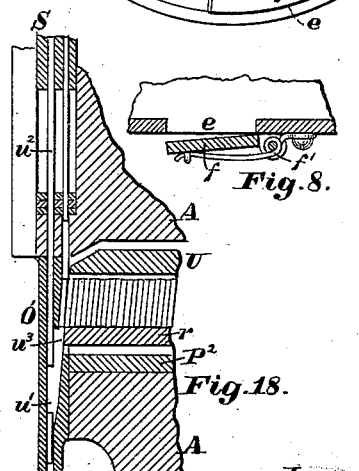
Witnesses:
Thomas Hibbard
Walter E. Lombard
Inventor:
Francis M. Carter
by N. C. Lombard
Attorney.

(No Model.)  5 Sheets—Sheet 5.
F. M. CARTER.
MACHINE FOR DRIVING HEADLESS NAILS.
No. 270,280. Patented Jan. 9, 1883.
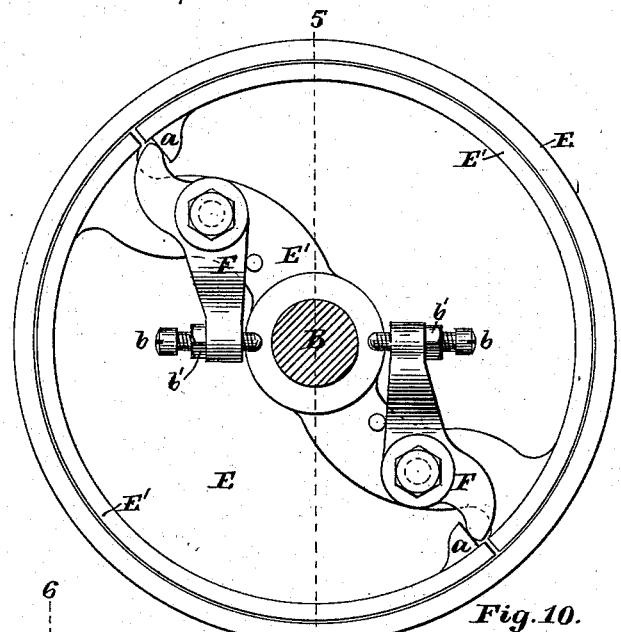
Fig. 10.
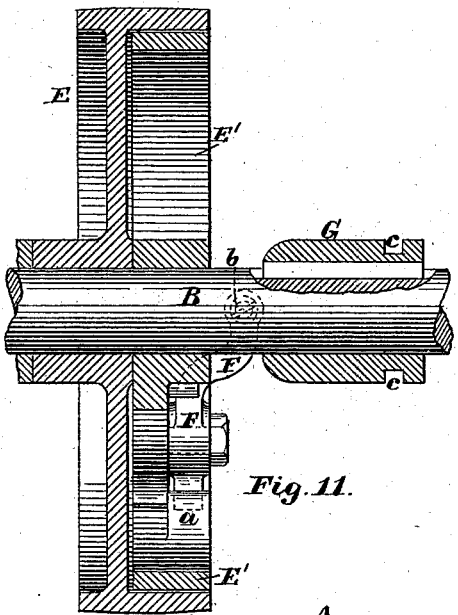
Fig. 11.
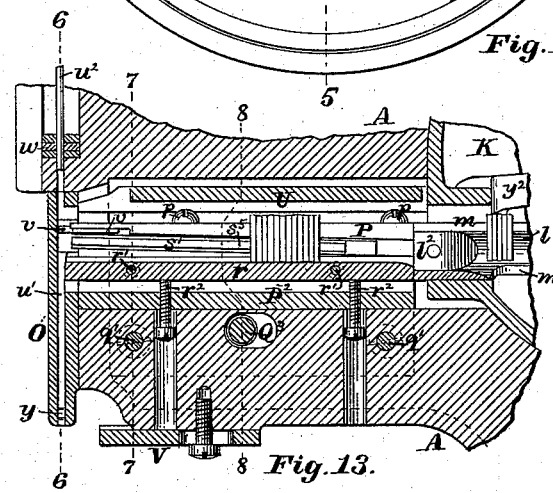
Fig. 13.
Fig. 14. Fig. 15.
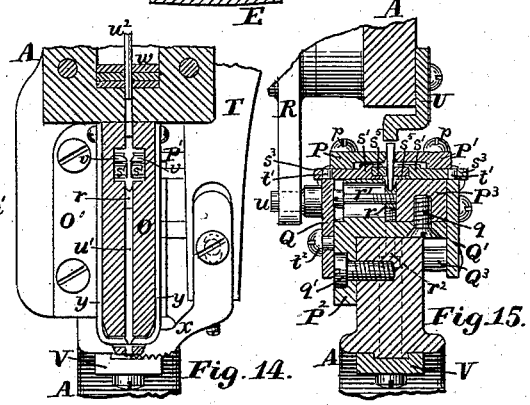
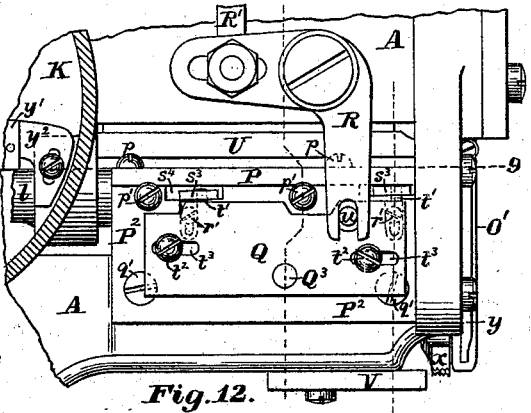
Fig. 17. Fig. 12.
Fig. 16.
Witnesses:
Thomas Hibbard
Walter E. Lombard
Inventor:
Francis M. Carter
by N. C. Lombard Attorney.
N. PETERS, Photo-Lithographer, Washington, D. C.

UNITED STATES PATENT OFFICE.

FRANCIS M. CARTER, OF MARLBOROUGH, MASS., ASSIGNOR TO THE SHEPHERD NAILING MACHINE COMPANY, OF NASHUA, N. H.

MACHINE FOR DRIVING HEADLESS NAILS.

SPECIFICATION forming part of Letters Patent No. 270,280, dated January 9, 1883.

Application filed September 8, 1882. (No model.)

*To all whom it may concern:*

Be it known that I, FRANCIS M. CARTER, of Marlborough, in the county of Middlesex and State of Massachusetts, have invented certain new and useful Improvements in Machines for Driving Headless Nails, of which the following, taken in connection with the accompanying drawings, is a specification.

My invention relates to that class of nailing-machines in which headless nails are used, and has for its object the production of a comparatively simple and inexpensive machine that shall automatically separate the nails, arrange them in line with their points downward, feed them in succession beneath the driver, and drive them one by one into a shoe-sole or other article to be nailed; and it consists in certain novel constructions, arrangements, and combinations of parts, relating more particularly to the separating of the nails from a promiscuous mass in bulk, arranging them in line with their points all in one direction, and feeding them successively beneath the driver, all of which will be best understood by reference to the description of the drawings and to the claims to be hereinafter given.

Figure 1:
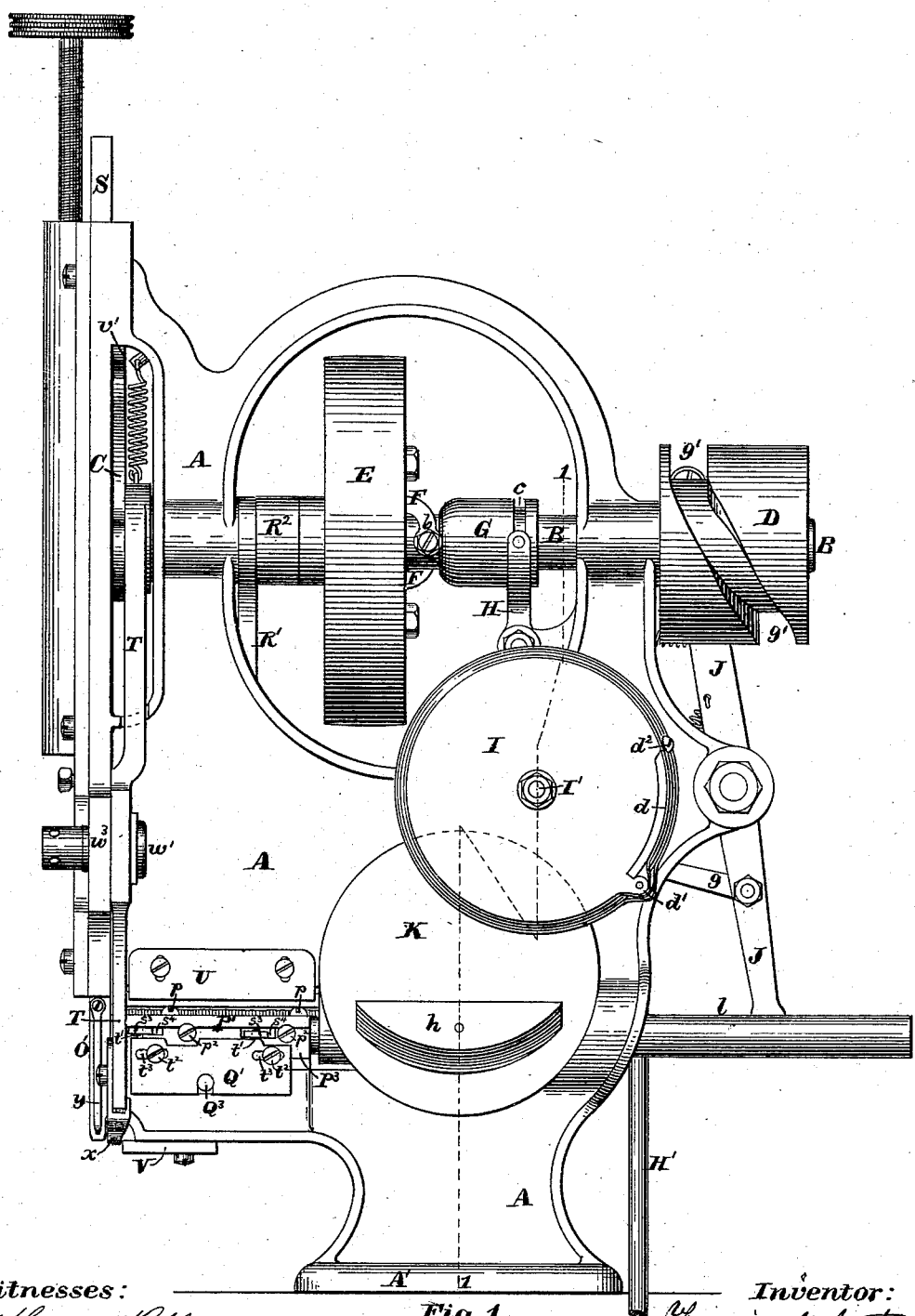
Figure 2:
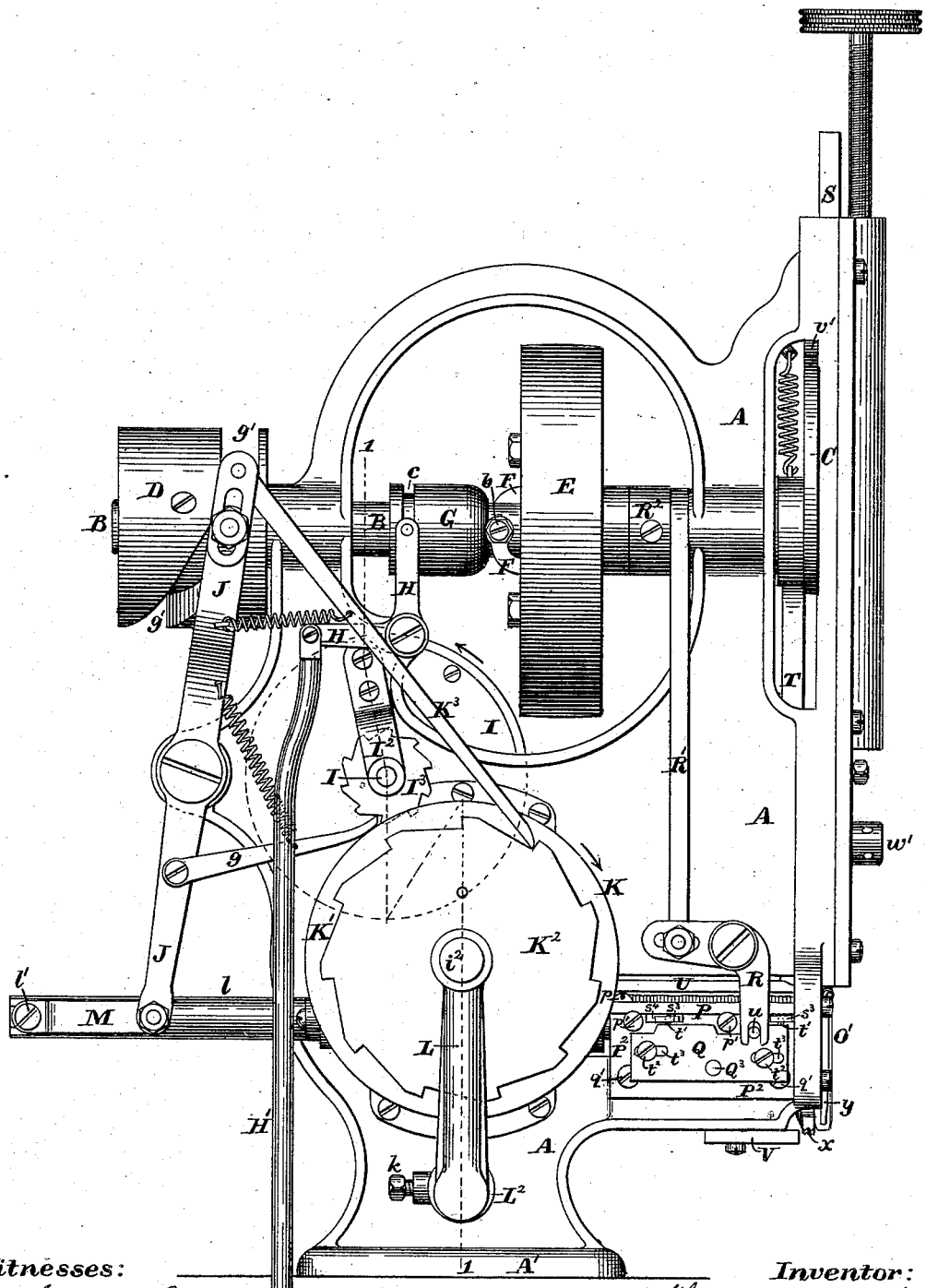

Figure 1 of the drawings is a front side elevation of a machine embodying my invention. Fig. 2 is an elevation of the opposite side. Fig. 3 is an elevation of the front end. Fig. 4 is a vertical transverse section on line 1 1 on Figs. 1 and 2, drawn to an enlarged scale. Fig. 5 is a partial horizontal transverse section on line 2 2 on Fig. 4. Fig. 6 is a vertical section on line 3 3 on Figs. 4 and 5. Fig. 7 is an elevation of the upper hopper. Fig. 8 is a partial section on line 4 4 on Fig. 7. Fig. 9 is a longitudinal section of the line-collecting tube and a portion of the telescopic feed-plunger, the other portion of the feed-plunger being shown in elevation. Fig. 10 is an elevation of the driving clutch-pulley. Fig. 11 is a section of the same on line 5 5 on Fig. 10. Fig. 12 is a partial rear elevation, drawn to an enlarged scale, with a portion of the lower hopper shown in section. Fig. 13 is a vertical longitudinal section of the same, taken through the center of the nail-channel. Fig. 14 is a vertical transverse section on line 6 6 on Fig. 13. Fig. 15 is a similar section on line 7 7 on Fig. 13. Fig. 16 is a similar section on line 8 8 on Fig. 13, and Fig. 17 is a horizontal section on line 9 9 on Fig. 12, with the plate P' removed. Fig. 18 is a partial vertical longitudinal section in the same plane as Fig. 13, and illustrating a modification of the nail-driving mechanism. Figs. 19 and 20 are respectively a partial longitudinal section and a transverse section of the nail-line-guiding channel-plates and the elastic-surfaced gripping and feed jaws; and Figs. 21 and 22 are respectively an elevation and an inverted plan of a portion of the forward end of one of the channel-plates and the spring-actuated gripper-fingers for holding the end nail in the line after it has been fed beyond the end of the channel-plates.

A is the frame of the machine, provided with the base-flange A', by means of which it may be secured to a column of usual form, but which, forming no part of my present invention, need not be shown or described.

B is a driving-shaft, mounted in bearings in the frame A, and having firmly secured to its front end the scroll-cam C and to its rear end the cylindrical path-cam D.

E is a driving-pulley, mounted loosely upon the shaft B in such a manner that it may revolve freely thereon while the shaft remains stationary; or it may be secured to the shaft B at will, so as to compel said shaft to revolve therewith, by means of a novel clutch mechanism, which I will now proceed to describe. Within the rim of the pulley E is fitted a second pulley or wheel, E', of a diameter slightly less than the inner diameter of the pulley E, and secured firmly upon the shaft B, so as to move therewith. The rim of the wheel E' is divided into two equal segments, each of which is connected by a single spoke to the central hub, as shown in Figs. 10 and 11. The free or movable end of each of the segments of the rim of the pulley or wheel E' is provided with an inwardly-projecting lug, a, with which the toe or movable end of the short arm of a lever, F, fulcrumed upon the spoke connected to the opposite segment, engages, as shown in Fig. 10. The opposite end of each of the levers F is provided with the round-pointed steel screw b, fitted to a female thread in said lever, and having a check or binding nut, b', as shown.

G is a hub, fitted by means of a key and spline-groove to slide endwise upon the shaft B, having its end toward the pulley E rounded or conical to engage with the rounded ends of the screws $b$ and force the long arms of the levers F outward, thereby causing the cut rim of the wheel E' to be expanded and forced into close contact with the rim of the pulley E, and thus cause the wheel E' and the shaft B to be revolved with the pulley E. The hub G is provided with a circumferential groove, $c$, with which pins set in the fork of the shipper-lever H engage, as shown in Figs. 1, 2, and 4. The lever H is connected by the rod H' to a treadle, (not shown,) by means of which the pulley E may be coupled to the shaft B at will, or released therefrom, a spring attached to the treadle (and not shown) retracting the hub G when the operator's foot is removed from the treadle, and the spring of the segments of the rim of the wheel E' causing them to assume their normal position as soon as the pressure of the levers F F is removed from the lugs $a\,a$.

I is a circular hopper, the periphery of which is made slightly conical, and provided with a door, $d$, hinged at $d'$, and secured by the screw $d^2$, as shown in Fig. 1. The inner head or radial wall of the hopper I has one or more openings, $e$, cut through it, which are partially closed by the hinged gates $f$, held open by the springs $f'$, and adjusted to give a greater or less opening by means of the screws $f^2$, all as shown in Figs. 4, 7, and 8. The hopper I is firmly secured upon the shaft I', which is fitted to and revolves in bearings in the frame A and in the stand $I^2$, and has secured thereon the ratchet-wheel $I^3$, with the teeth of which the pawl $g$, pivoted to the lever J, engages, as shown in Fig. 2, as a means of imparting to the hopper I an intermittent rotary motion about its axis, said motion being obtained from the cam D through the medium of the lever J, which carries at or near its upper end a stud or roll, which fits into and is acted upon by the part $g'$ of the cam D in a well-known manner.

K is a cylindrical chamber, secured in a fixed position to the frame A, and provided with the segmental-shaped bucket-like projection $h$, open at the top and communicating through opening $h'$ in the fixed head of said cylinder with the interior of the cylinder K, as shown in Fig. 4. The rear end of the cylinder K is enclosed by the head K', provided with the inwardly-projecting rim $i$, a series of curved buckets or shelves, $i'\,i'$, and the outwardly-projecting hub $i^2$. The hub $i^2$ has a bearing in the stand or radius-arm L, and the rim $i$ has a bearing in the enlarged end of the cylinder K, within which bearings the head K' is made to intermittently revolve by means of the ratchet-wheel $K^2$, pawl $K^3$, the lever J, and the cam D, as shown in Fig. 2.

In the bottom of the cylinder K is placed a curved inclined chute, $j$, which extends into the bucket-like projection $h$ beneath the hopper I, in position to receive the nails as they are discharged from the hopper I and direct them upon the rim $i$ at the lower part of the head K', in positions to be carried upward by the buckets $i'$ as the head K' is revolved. Constant rotation of the head K' would in time wear the journal $i^2$ and its bearing faster than the rim $i$ and its bearing, and as a consequence the bearing in the radius-arm L will require to be adjusted vertically, which I accomplish in the following manner: The radius-arm L is provided with the cylindrical shank L', which has a bearing in the eccentric thimble or bushing $L^2$, fitted to a socket in the hub $A^2$ of the frame A in such a manner that it may be revolved therein, and thus raise or lower the arm L and the head K', said radius-arm L being secured in position when properly adjusted by means of the set-screw $k$, which screws into the hub $A^2$, passes through a slot in the eccentric bushing $L^2$, and impinges upon the shank L', as shown in Fig. 23, which is a section on line 10 10 on Fig. 4. A tube, $l$, is inserted through the cylinder K below its axis, and has a vertical slot cut through its forward end to receive the nails, and in which the line of nails is formed preparatory to feeding them to the driving-tool, and also has a portion of one side cut away at its rear end, or has formed in its side a slot extending from its rear end forward a sufficient distance to permit a free movement of the screw $l'$, which secures one end of the link M to the feed-plunger, the opposite end of said link M being pivoted to the lower end of the lever J, as shown in Fig. 2. The slot $m$ through the upper side of the forward end of the tube $l$ is cut through to the extreme forward end of said tube, and is made of a width a little less than the width of the nail to be driven at its widest end, so that the nails, when dropped into said slot, will hang by their tapering sides with a portion of their lengths projecting above the tube $l$, as shown in Figs. 9, 13, and 15. A much wider slot, $m'$, is made through the under side of the tube $l$, directly beneath the slot $m$, but somewhat shorter than the latter, a portion of the under side of said tube $l$ at its extreme front end being left uncut, said uncut portion toward the slot $m'$ being beveled down to a thin edge, as shown in Fig. 9.

N is an inclined plate, extending upward from the tube $l$ to near the top of the cylindrical chamber K, and having its upper end curved backward to a position beneath the rim $i$ and buckets $i'$ of the head K, and has formed in its upper side a series of parallel grooves or roadways, $n\,n$, extending from its upper end to its lower end, which rests upon the tube $l$, the bottoms of said grooves or roadways just coinciding with the back side of the slot $m$ in said tube, as clearly shown in Fig. 4. This plate N is secured to the bar N', extending across the cylinder K, by screws $n'\,n'$, and to the tube $l$ by screw $n^2$, as shown in Figs. 4 and 6, and has its upper portion, upon which the nails first fall from the buckets $i'$, inclined at a less inclination than its lower portion, for the purpose of preventing the nails from bounding away from said plate N, as would be the case if the nails fell upon a surface arranged at so steep an inclination as is given to the lower portion of said plate and as is necessary to be given to said lower portion, in order that the nails, when sliding down said plate point first, shall readily enter the slot m in the bar or tube l.

O is a shield-plate, placed just in front of the roadway-plate N, and secured to the bar N', as shown in Figs. 4 and 6, the purpose of said shield being to prevent the nails, when they fall upon the roadway-plate N, being thrown by a rebound over the tube l, instead of being directed into the slot m.

A feed-plunger for moving the nails along the slot m as they are deposited therein is fitted to reciprocate within the tube l, and consists of the feed-plate o, the tube o', to which said plate is secured or of which it forms a part, the slotted rod $o^2$, and the spring $o^3$, all constructed and arranged to form a yielding feed-plunger, connected together by the pin $o^4$, to which motion is imparted by means of the cam D, lever J, and link M, which latter is pivoted to the rod $o^2$ at l'.

The operation of forming a line of headless nails of that kind which are formed by cutting a tapering strip from a plate or bar of even thickness is as follows: A quantity of the nails are placed in the hopper I, the gates f having been previously adjusted to the proper degree of opening, and the operator places his foot upon the shipper-treadle to operate the clutch to connect the pulley E to the shaft B and cause said shaft to revolve, carrying with it the cam D, which, acting upon the lever J, causes it to vibrate and impart, through the pawls g and $K^3$ and ratchet-wheels $I^3$ and $K^2$, intermittent revolving motions to the hopper I and the cylinder-head K', respectively. As the hopper I revolves about its axis the mass of nails contained therein is tumbled about therein, but always seeks to occupy the lowest place in said hopper. As either of the gates f approaches the lowest position in its revolution one or more nails will be discharged through the opening between it and the wall of the hopper, and will fall into the bucket-like projection h and upon the inclined chute j, down which they slide to the lowest part of the interior of the cylinder K, and are deposited upon the rim i of the cylinder-head K'. By the intermittent movement of the head K' about its axis the nails deposited upon its rim i are gradually carried upward by the buckets i' to a point near the top of the cylinder K, where they are discharged from said buckets and fall upon the inclined roadway-plate N in all conceivable positions, some crosswise of the grooves, some parallel therewith and with their points downward, and others with their wide ends downward. The nails that fall upon the plate N, so as to lie lengthwise in the grooves n n, will generally lie upon one of their cut edges, and as they slide down said grooves, if the narrow ends of the nails are downward, they will drop into the slot m in the tube l till they hang by their taper sides, resting against the sides of said slot. If the nails descend the grooves n upon their cut or tapered edges, with their widest ends in advance, they will strike upon the top of the tube l and fall over it upon the chute j, to be again carried up by the buckets i' and again deposited upon the plate N. If the nails slide down the grooves n lying upon their broader or parallel sides, they will fall through the slot m in the tube l upon the chute j, to be again carried up by the buckets i'. At each revolution of the driving-shaft B the feed-plunger $o\ o'\ o^2$ is reciprocated, and at each forward motion thereof it moves all the nails properly deposited in the slot m forward toward the driving-tools and from in front of the plate N, transferring said nails from the slot m in the tube l to a channel, to be hereinafter described, which abuts upon and forms a continuation of the slot m.

It has been found by actual test that nails of the kind above described—viz., nails having two cut edges oblique to each other and cut from a sheet or bar of even thickness—do not have two parallel sides; but on the contrary the nails are thinner in both directions at their narrowest ends than at their widest ends. This is due to the fact that the die or cutter in cutting the plate compresses the metal for a short distance from the line of cut, and as a portion of the length of the nail is of a width not greater than twice the width of the strip of metal so compressed at each cut, it follows that that portion of the nail will be reduced in thickness, while a portion of the center of the nail at the wider end will remain of the same thickness as the plate from which it was cut. As a consequence of this reduction of thickness at the point of the nail, it has been found that if an attempt were made to form a line of nails of considerable length by feeding them one after another, the last nail pushing those preceding it by means of a plunger the end of which was at right angles to its line of movement, the forward nails would not remain in perpendicular positions, but the wider upper ends would advance faster than the points or narrower ends, and as a consequence the pressure of said plunger upon the line of nails would tend to wedge the forward nails between the sides of the slot m so hard as to interfere with the proper feeding of the nails. To obviate this difficulty I make the plunger-plate o with its front end inclined backward, as shown in Fig. 9, to compensate for the difference in the thickness of the two ends of the nails, so that the nails, when they leave the slot m in the tube l and pass between the guide-bars and above the adjustable grooved bottom bar, to be hereinafter described, shall be in a perpendicular position, and so that the pressure of the plunger shall tend to raise the nails and loosen them in the slot m.

Between the forward end of the tube l and the throat-plate O' are two adjustable guide-plates, P and P', arranged with their inner edges parallel with each other and a distance apart just equal to the width of the slot $m$ in the tube $l$, and their upper surfaces on a level with the top of said tube, said plates thus forming between them a channel extending from the forward end of the tube $l$ to the back side of the throat-plate O', and along which the nails deposited in the slot $m$ of the tube $l$ are fed to the desired position beneath the driving-tooth.

The plates P and P' are secured in position upon the blocks $P^2$ and $P^3$ by means of the screws $p$ $p$, and may be adjusted by means of the screws $p'$ $p'$ and $p^2$ $p^2$. The block $P^3$ is secured to the block $P^2$ by two screws $q$ $q$, (only one of which is shown,) and the block $P^2$ is secured to the frame A by the screws $q'$ $q'$, as shown in Figs. 12 and 15.

Between the blocks $P^2$ and $P^3$ is placed a grooved bar, $r$, which is clamped to the block $P^2$ by means of the screws $r'$ $r'$, one of which is shown in full lines in Fig. 15 and both in dotted lines in Fig. 12, and is adjustable vertically by means of the set-screws $r^2$ $r^2$, (shown in full lines in Fig. 13 and in dotted lines in Fig. 15,) and serves to keep the points of the nails in line and prevent them from dropping too low.

The interior of the tube $l$ has fitted therein at its forward end the two wedge-like filling-pieces $l^2$ $l^2$, which serve to bring the nails into an upright position in a direction transversely of the tube $l$ in case they should hang at different angles in the slot $m$, and thus properly present them to enter the channel between the plates P and P' and the groove in the bar $r$.

A pair of feed clamp-bars, $s'$ $s'$, are arranged, one beneath each of the guide-plates P and P' and resting upon the slightly-inclined upper surfaces of the blocks $P^2$ and $P^3$, against which they are lightly pressed by the light springs $s^2$, interposed between said clamp-bars and the guide-plates P and P', there being sufficient space between said feed-clamps and guide-plates to permit of the insertion of said spring.

The feed clamp-bars $s'$ $s'$ are each provided with two projecting ears or arms $s^3$ $s^3$, which lie in and project through slots $s^4$ $s^4$, formed in blocks $P^2$ and $P^3$, and have formed therein oblique slots $t$ $t$, in which are pins $t'$ $t'$ formed upon or set in the upper edges of the plates Q and Q', which are mounted by means of the screws $t^2$ $t^2$ and slots $t^3$ $t^3$ upon the outer vertical faces of the blocks $P^2$ and $P^3$, and connected together so as to be compelled to move in union by means of the bolt $Q^3$, which is made fast to the plate Q and passes through a slot in the frame A and through a slot in the lower edge of the plate Q', as shown in Figs. 1, 2, 13, and 16.

A short reciprocating movement is imparted to the plates Q and Q' by means of the elbow-lever R, the pendent arm of which is forked and engages with the pin $u$, formed upon or secured to the plate Q, the eccentric-rod R', and an eccentric, $R^2$, secured upon the driving-shaft B, as shown in dotted lines in Fig. 3. During the first part of the forward movement of the plates Q and Q' the pins $t'$ $t'$ move along the slots $t$ $t$ in the ears $s^3$ $s^3$ of the clamp-bars $s'$ $s'$, the pressure of springs $s^2$ being sufficient to prevent the bars $s'$ $s'$ from being moved endwise till they have been forced inward against the line of nails, when the further forward movement of the plates Q and Q' will cause said clamp-bars to move endwise toward the front end of the machine, carrying with them the line of nails clamped between them, and at the same time slightly lifting said nails to free them from the plates P and P' by virtue of the fact that said clamp-bars are arranged and move in paths slightly inclined to the upper surface of said plates P and P', as shown in Fig. 13.

Clamping-bars arranged to seize a line of nails by their sides and feed them toward the driving mechanism have been used before, but provided with metallic surfaces to bear upon the edges of the nails, and consequently if the nails varied slightly in width, as they do, the jaws would only grip the widest, causing trouble in properly feeding the nails forward. To remedy this difficulty I insert in a groove in the inner edge of each of the clamping-bars $s'$ $s'$ a strip of rubber or other suitable elastic material, $s^5$, which projects slightly beyond the edge of the metal bar $s'$, which by virtue of its elastic properties will accommodate itself to the slightly irregular surface of the line of nails when pressed thereto, and grip each nail and move it upward and forward solely by virtue of the pressure so caused upon each individual nail, so that there will be no crowding of the nails in the line, as is the case where a portion only of the nails are gripped and the remainder have to be pushed along by those in the rear.

The forward ends of the plates P and P' extend nearly to the rear side of the vertical channel $w'$ in the throat-plate O', down which the nails are driven, and are cut away upon their under sides, or are reduced in thickness to make room for the spring-actuated gripper-fingers $v$ $v$, which are pivoted thereto and project beyond the front ends of the plates P and P', or to the front side of the channel $w'$, as shown in Figs. 13, 17, 21, and 22, said fingers serving to hold the front nail in the line in proper position beneath the driver and yield to allow the nail to be separated from the line and be driven by the downward movement of the driver $u^2$, while the clamping-bars $s'$ $s'$ are pressing the line of nails hard against the throat-plate O'.

The driver $u^2$ is set in the lower end of the driver-bar S, mounted in the front portion of the frame A in a vertical position, and provided with the anti-friction roll $v'$, mounted upon a stud set in said bar.

The driver-bar is raised by means of the scroll-cam C acting upon the roll $v'$, and is forced downward by a spring. (Not shown, but applied to said bar in any of the well-known ways.) The downward movement of said bar is limited and arrested by the leather washers $w$. (Shown in Fig. 3.)

T is the feed-lever, mounted at or near the middle of its length upon the fulcrum-pin $w'$, which is adjustably secured in the slot $w^2$, formed in the ear $w^3$ of the frame A, the lever T being also slotted to permit such adjustment of the pin $w'$ without changing the position of the lever T, and also to permit a slight vertical movement of said lever, for the purpose of lifting the feed-foot $x$, secured to its lower end, from the surface of the shoe-sole during the backward movement of said foot. The upper end of the lever T is made in the form of an eccentric-strap, and encompasses the periphery of an eccentric mounted upon the shaft B, in close proximity to the cam C. A pair of light leaf-springs, $y\ y$, are secured to the throat-plate O' by their upper ends, and have their lower ends bent at right angles to the main body thereof and inserted in holes in the sides of the nose of the throat-plate, near its lower end, so that they nearly meet in the center of the channel $u'$, said ends being beveled, as shown, for the purpose of centering the point of the nail and properly presenting it to the surface of the shoe-sole.

U is an adjustable stop-plate for preventing the nails from working upward out of the line and interfering with the proper feeding of the nails, and may be adjusted vertically to adapt the machine to different lengths of nails.

V is an adjustable gage, against which the edge of the shoe-sole is placed for the purpose of determining the distance from the edge of the sole that the nails shall be driven.

Within the cylinder K, and just above the forward end of the tube $l$, is placed the plate $y'$, having its upper edge inclined downward in the form of a narrow inclined plane, the point of which is toward the center of the cylinder, with one of its vertical faces coinciding with one of the sides of the slot $m$ in the tube $l$. This plate $y'$ is secured to the curved arm $y^2$, which in turn is secured to a boss in the interior of the cylinder K by the screw $z$, as shown in Figs. 5 and 6. The rearward end of the arm $y^2$ is curved laterally or in the direction of the length of the axis of the cylinder K, so that its point extends some distance beyond the opposite side of the slot $m$ from that on which the plate $y'$ is placed.

The object of the plate $y'$ and arm $y^2$ is to remove any nails that may have fallen upon the line of nails in said slot in such a position as to be carried along by said line of nails without falling into the bottom of the cylinder, as it is desirable they should before they arrive at the wall of the cylinder through which the tube $l$ passes.

In the modification illustrated in Fig. 18 the driver-bar S has set in its lower end two drivers of different lengths, and the throat-plate O' is provided with the vertical channel $u'$ and a second channel, $u^3$, in the rear of the channel $u'$, and inclined thereto and communicating therewith near the lower end of the channel $u'$. The driver which works in the channel $u'$ and drives the nail into the sole when in its highest position extends below the level of the lower ends of the nails arranged in line, while the lower end of the other driver is raised considerably above the upper ends of said nails. At each descent of the driver-bar the front driver strikes upon and drives into the sole of the shoe a nail previously deposited in the lower end of the channel $u'$, and the rear or shorter driver at the same time cuts off the forward nail from the line and forces it down the channel $u^3$ to a position alongside of the long driver, where it remains till the long driver is raised by the upward movement of the driver-bar. By this arrangement of separating and driving the nails the stroke of the driver may be materially reduced, and there can never be more than one nail beneath the main driver at the same time.

The necessity for making the feed-plunger elastic or yielding is the fact that the number of nails deposited in the slot $m$ between any two forward movements of said plunger are not uniform, and the further fact that the lever J, which operates said plunger, has a positive and uniform vibration.

What I claim as new, and desire to secure by Letters Patent of the United States, is—

1. In a nailing-machine for separating and driving headless nails, the hopper I, provided with the door $d$ in its periphery, and one or more openings, $e$, in its inner head or radial wall, and one or more hinged gates adapted to be adjusted to regulate the degree of opening thereof, substantially as and for the purposes described.

2. The hopper I, provided with one or more openings, $e$, in its radial wall, in combination with one or more hinged gates, $f$, one or more springs, $f'$, and one or more set-screws, $f^2$, all arranged and adapted to operate substantially as and for the purposes described.

3. The combination of the cylinder K, provided at one end with the bucket-like projection $h$, communicating with the interior of said cylinder, the revolving head K', mounted in and closing the opposite end of said cylinder and provided with the buckets $i'$, and the curved inclined chute $j$, leading from the bucket $h$ to the head K', substantially as described.

4. In a machine for separating and driving headless nails, the combination of the grooved inclined plate N, having a portion of its length curved to an angle of less inclination, the slotted horizontal tube or bar $l$, and means of depositing the nails upon the curved portion of said inclined plate, substantially as described.

5. The combination of the grooved inclined plate N, the slotted tube or bar $l$, the shield-plate O, and means of depositing the nails upon the inclined plane, substantially as described.

6. The combination of the fixed cylinder K, the rotating head K', provided with the buckets $i'$, the inclined plate N, having a portion of its length curved to an angle of less inclination, and the slotted tube or bar $l$, all arranged and adapted to operate substantially as and for the purposes described.

7. The combination of the fixed cylinder K, the rotating head K', provided with the buckets $i'$, the inclined plate N, the shield O, and the slotted tube or bar $l$, all arranged and adapted to operate substantially as and for the purposes described.

8. In combination with the fixed cylinder K, the rotating head K', mounted in a bearing adjustable vertically or at right angles to the axis of revolution of said head, substantially as and for the purposes described.

9. The combination of the fixed cylinder K, the rotating head K', the radius-arm L, provided with the shank L', and a bearing for the journal $i^2$ of the head K', and the eccentric sleeve or bushing $L^2$, all constructed, arranged, and adapted to operate substantially as and for the purposes described.

10. The combination of the slotted tube $l$ for receiving the nails in line, an elastic or yielding plunger for feeding the nails from said tube, the cam D, lever J, and the link M, all constructed, arranged, and adapted to operate substantially as and for the purposes described.

11. In combination with the slotted tube $l$, the reciprocating nail-feeding plunger $o$ $o'$, having its front end made inclined, substantially as and for the purposes described.

12. In combination with the slotted tube $l$ and the reciprocating feed-plunger $o$ $o'$, the two curved plates $y'$ and $y^2$, arranged and adapted to operate substantially as and for the purposes described.

13. In a machine for separating and driving headless nails, the guide-plates P and P', arranged to form a channel along which the line of nails may be fed to the driving-tools, in combination with the spring-actuated gripper-fingers $v$ $v$, pivoted to the forward ends of said guide-plates, and arranged to hold the end nail in the position to be struck by the descending driver, substantially as and for the purposes described.

14. A pair of feed clamp-bars for seizing and moving bodily a line of nails toward the driving-tool, having their inner edges, which come in contact with the nails, composed of rubber or other suitable elastic substance, substantially as and for the purpose described.

15. The feed clamp-bars $s'$ $s'$, arranged upon slightly-inclined bearings beneath the plates P and P', in combination with mechanism for imparting to said clamp-bars a transverse and a longitudinal movement, the latter being in a plane slightly inclined to the plates P and P', substantially as and for the purposes described.

16. The clamp-bars $s'$ $s'$, provided with the oblique slots $t$ $t$, in combination with the plates Q and Q', provided with the pins $t'$ $t'$, and mechanism for imparting to said plates Q and Q' a reciprocation, substantially as described.

17. The combination of the bars $s'$ $s'$, provided with the oblique slots $t$ $t$, the plates Q and Q', provided with the pins $t'$ $t'$ and connected together by the rod $Q^3$, the stud or pin $u$, the elbow-lever R, and mechanism for imparting to said lever R a vibratory motion about its fulcrum, substantially as described.

18. In combination with the guide-plates P and P', the grooved adjustable bar $r$, for guiding the lower ends of the nails, substantially as described.

19. The combination of the tube $l$, having formed therein the slots $m$ and $m'$, and provided with the wedge-shaped filling-pieces $l^2$ $l^2$, the plates P and P', and the grooved adjustable bar $r$, all arranged and adapted to operate substantially as described.

20. The combination of the hopper I, rotating head K', ratchets $I^3$ and $K^2$, cam D, lever J, pawls $g$ and $K^3$, link M, and feed-plunger $o$, $o'$, and $o^2$, all constructed, arranged, and adapted to operate substantially as described.

21. The throat-plate O', provided with the two channels $u'$ and $u^3$, in combination with two drivers of different lengths set in and operated by the same driver-bar, substantially as and for the purposes described.

22. The combination of the guide-plates P and P', the clamp-bars $s'$ $s'$, the blocks $P^2$ and $P^3$, and the springs $s^2$ $s^2$, interposed between the upper surfaces of the clamp-bars $s'$ $s'$ and the under surfaces of the plates P P', substantially as and for the purposes described.

23. A feed-plunger composed of the tube $o'$, slotted rod $o^2$, and spring $o^3$, connected together by the pin $o^4$, and adapted to operate substantially as and for the purposes described.

In testimony whereof I have signed my name to this specification, in the presence of two subscribing witnesses, on this 4th day of September, A. D. 1882.

FRANCIS M. CARTER.

Witnesses:
N. C. LOMBARD,
W. E. LOMBARD.